US009459348B2

(12) United States Patent
Jinkins et al.

(10) Patent No.: US 9,459,348 B2
(45) Date of Patent: Oct. 4, 2016

(54) MILLIMETER WAVE RADAR SYSTEM FOR AND METHOD OF WEATHER DETECTION

(75) Inventors: Richard D. Jinkins, Rewey, WI (US); Richard M. Rademaker, Rijswijk (NL); Daniel L. Woodell, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 745 days.

(21) Appl. No.: 13/492,580

(22) Filed: Jun. 8, 2012

(65) Prior Publication Data
US 2013/0328715 A1 Dec. 12, 2013

(51) Int. Cl.
*G01S 13/95* (2006.01)
*G01W 1/00* (2006.01)

(52) U.S. Cl.
CPC ............... *G01S 13/953* (2013.01); *G01W 1/00* (2013.01)

(58) Field of Classification Search
CPC .......................................... G01S 13/95–13/958
USPC ................................................ 342/26 R–26 D
See application file for complete search history.

(56) References Cited

U.S. PATENT DOCUMENTS

| 4,600,925 | A   | * | 7/1986  | Alitz et al. ................... 342/26 B |
| 5,598,359 | A   |   | 1/1997  | Montag et al.                            |
| 5,839,080 | A   |   | 11/1998 | Muller et al.                            |
| 6,289,277 | B1  |   | 9/2001  | Feyereisen et al.                        |
| 6,388,608 | B1  |   | 5/2002  | Woodell et al.                           |
| 6,536,948 | B1  | * | 3/2003  | Vivekanandan et al. ..... 374/161        |
| 7,307,583 | B1  |   | 12/2007 | Woodell et al.                           |
| 7,515,087 | B1  |   | 4/2009  | Woodell et al.                           |
| 7,619,556 | B1  |   | 11/2009 | McCusker                                 |
| 7,696,920 | B1  | * | 4/2010  | Finley et al. ................ 342/26 B  |
| 7,868,811 | B1  |   | 1/2011  | Woodell et al.                           |
| 7,917,255 | B1  | * | 3/2011  | Finley ............................ 701/9 |
| 8,098,192 | B1  | * | 1/2012  | Wichgers et al. ............. 342/65      |
| 2009/0219196 | A1 | * | 9/2009 | Bunch et al. ................ 342/176    |

OTHER PUBLICATIONS

Bambha et al. "A compact millimeter wave radar for airborne studies of clouds and precipitation," Geoscience and Remote Sensing Symposium Proceedings, 1998. Jul. 6-10, 1998. vol. 1. pp. 443-445.*
Kulemin, Gennadiy P. "Millimeter-wave radar targets and clutter". Artech House. Inc. 2003.*
International Search Report and Written Opinion for International Application No. PCT/US2012/043509, mail date Feb. 5, 2013, 9 pages.
Yildirim, O., Millimeter Wave Radar Design Considerations, Journal of Electrical & Electronics Engineering, vol. 3, No. 2, 2003, pp. 983-986.
Honeywell RDR-4B Forward Looking Windshear Detection/Weather Radar System User's Manual with Radar Operating Guidelines, Rev. 6, Jul. 2003, 106 pages.
(Continued)

*Primary Examiner* — Matthew M Barker
(74) *Attorney, Agent, or Firm* — Donna P. Suchy; Daniel M. Barbieri

(57) ABSTRACT

A system and method relates to a weather detection system using millimeter wave radar data. Processing electronics receives millimeter wave radar (MMWR) data and senses a presence of weather spatial extent using return strength data associated with the MMWR data. The processing electronics uses spectral width data associated with the MMWR data to assign a level to the weather in the spatial extent.

19 Claims, 4 Drawing Sheets

(56) References Cited

OTHER PUBLICATIONS

Kuntman, D., Airborne system to address leading cause of injuries in non-fatal airline accidents, Turbulence Detection, Mar. 2000, 4 pages.

Technical Standard Order (TSO-C115b), Airborne area navigation equipment using multi-sensor inputs, Department of Transportation, FAA, Washington, D.C., dated Sep. 30, 1994, 11 pages.
International Preliminary Report on Patentability for PCT Application No. PCT/US2012/043509, dated Dec. 9, 2014, 8 pages.

* cited by examiner

MILLIMETER WAVE RADAR SYSTEM FOR AND METHOD OF WEATHER DETECTION

FIELD OF THE INVENTION

The present specification relates generally to the identification of weather and/or weather hazards or potential weather hazards. More particularly, the present specification relates to a method of and a system for detecting weather and/or weather hazards or potential weather hazards.

Conventionally, pilots use weather radar systems to detect and avoid hazardous weather. The weather radar systems provide radar signals and receive radar return signals. The radar return signals are processed to provide graphical images to a radar display. The radar display is typically a color display providing graphical images in color to represent the severity and location of weather. Some aircraft weather radar systems also include other hazard detection systems, such as, a turbulence detection system. The turbulence detection system can provide indications of the presence of turbulence or other hazards. Conventional weather radar systems include those manufactured by Rockwell Collins, Inc., Honeywell International, Inc. and others and generally use radar signals in the X-band frequency range (e.g., 8-12 Gigahertz (GHz)).

Some aircraft also utilize lightning sensors or lightning detection systems. Conventional lightning detection systems or lightning sensors use automatic direction finding (ADF-like) equipment such as, radio frequency (RF) equipment or narrow band optical imaging equipment. Lightning sensors can include a display for showing the presence of lightning with respect to a position of the aircraft.

Generally, millimeter wave radar (MMWR) have been employed on aircraft for various functions, such as, targeting functions, terrain detection, all weather landing, etc. However, MMWR signals produced by conventional MMWR systems generally do not support classic weather radar functions and are prone to atmospheric attenuation. MMWR signals or W-band waves can have a frequency between 13-300 GHz or have a wavelength in the millimeter range.

Therefore, there is a need for a weather or hazard detection system and method using millimeter wave radar (MMWR) data from a millimeter wave radar (MMWR) radar system. Further, there is a need for a system for and a method of determining a presence of a weather hazard, such as convective cells, within a geographic area using an MMWR. There is also a need for a MMWR weather radar system and method. There is also a need to use lightning sensor data with MMWR data to detect weather and/or weather hazards.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a weather radar system for an aircraft. The weather radar system includes processing electronics for using millimeter wave radar (MMWR) data. The processing electronics senses a presence of weather and spatial extent of the weather using return strength associated with the MMWR data. The processing electronics uses spectral width data in the MMWR data to assign a level to the weather associated with the spatial extent.

Another exemplary embodiment relates to a method of displaying an indication of weather on an aircraft display. The method includes receiving millimeter wave radar (MMWR) data, and estimating a presence of weather in a spatial region using a reflectivity parameter associated with the MMWR data. The method also includes determining levels of weather (e.g., precipitation levels, threat levels, etc.) in the spatial region using a spectral width parameter associated with the MMWR data.

Another exemplary embodiment relates to a method of displaying weather. The method includes receiving millimeter wave radar (MMWR) data from a sensor. The method also includes using reflectivity data in the MMWR data to determine location of the weather. The method also includes using spectral width data in the MMWR data to map levels of weather, and displaying the levels of weather (e.g., precipitation levels, threat levels, etc.).

BRIEF DESCRIPTION OF THE DRAWINGS

The exemplary embodiments will become more fully understood from the following detailed description, taken in conjunction with the accompanying drawings, wherein like reference numerals refer to like elements, in which.

DETAILED DESCRIPTION

Figure 1:
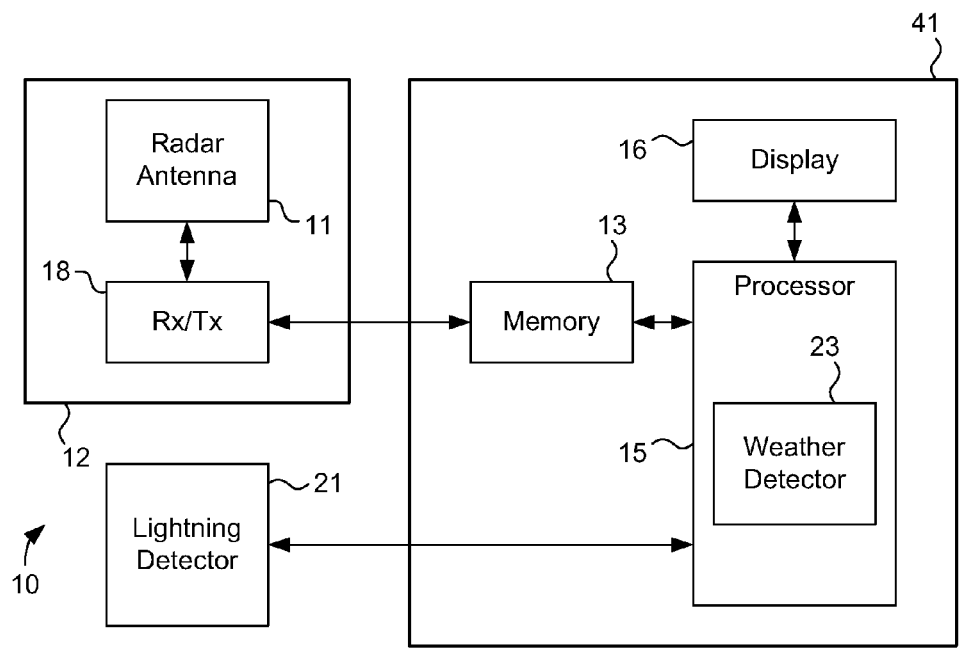
FIG. 1 is a general block diagram of a weather detection system in accordance with an exemplary embodiment.

The present specification describes a system for and method of using millimeter wave radar (MMWR) data to detect weather and map levels of weather. Advantageously, MMWR hardware and software can be used to create MMWR data that can be processed to provide a weather display. Before describing in detail the particular improved system and method, it should be observed that the invention includes, but is not limited to a novel structural combination of conventional data/signal processing components, software and communications circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, a weather radar system 10 may be used and deployed in an aircraft. Weather radar system 10 can be similar to the systems described in U.S. Pat. Nos. 6,388,608 and 7,515,087, the entirety of which are incorporated by reference, or described in U.S. application Ser. Nos. 12/177,767 and 11/153,972, the entirety of which are incorporated by reference. The systems in these references incorporated herein by reference can be adapted to use MMWR data as described herein.

System 10 includes a weather detection system 41, an airborne millimeter wave radar system 12, and a lightning detector 21. Lightning detector 21 is optional. Millimeter wave radar (MMWR) system 12 can be a radar system operating in the W-band and providing reflectivity and spectral width data. Alternatively, processor 15 can provide reflectivity and spectral width data derived from returns received by system 12. In one embodiment, system 12 can be a radar system having a hardware platform similar to an WXR-2100 radar system manufactured by Rockwell Collins, Inc. and modified as described herein for use with W-band radar. Lightning detector 21 can be a Storm Scope or Strike Finder system in one embodiment.

Weather detection system 41 includes a processor 15, a display 16, and a memory 13. Processor 15 can include a weather detector 23 in one embodiment. Memory 13 can be integrated within processor 15. Weather detection system 41 is advantageously configured to use millimeter wave radar (MMWR) data derived from signals received from system 12 or directly received from system 12. The MMWR data or signals are associated with MMWR returns received by antenna 11 and receiver/transmitter circuit 18. Antenna 11 and circuit 18 can be part of airborne millimeter wave radar system 12 or system 41. Systems 12 and 41 can be provided as a single line replacement unit or as multiple line replaceable units.

Display 16 can be any type of display. Display 16 can be a multifunction display separate from system 41 or system 12 can be integrated with either system 41 or system 12, or can be a stand alone display.

Weather detector 23 can be separate from or part of an airborne millimeter wave radar (MMWR) system 12. Weather detector 23 receives the MMWR data and provides indications of weather on display 16 in one embodiment. Weather detector 23 can also receive lightning data and use lightning data to assess the weather detected using MMWR data from MMWR system 12 in one embodiment. Lightning detector 21 can provide an azimuth angle from the aircraft to the lightning flash, time of flash, duration of flash, polarity of flash, frequency of flash, and amplitude of lightning flashes. Detector 23 can use any of this data or combination of this data to assess a level of weather. For example, higher frequency of flashes in a spatial extent of weather can indicate a higher level of weather or a hazard.

System 10 advantageously determines weather spatial extent and levels of weather using MMWR data in one embodiment. In an alternative embodiment, system 10 uses MMWR data paired with data representing angle to a lightning strike from lightning detector 21 as well as other lightning data to assess and locate weather. For example, high spectral width in the MMWR data combined with lightning flashes in a weather region is a strong indicator of a convective cell. In one embodiment, a threat description (e.g., a convective cell indication) for the weather is provided on display 16. The threat description can be text, symbols, colored regions, or other visual indicia on display 16.

Applicants believe that using lightning data allows system 10 to identify and detect weather cells at longer ranges in one embodiment. Applicants believe that the identification of convective cells (and hazards associated therewith) with system 10 has superior ranging accuracy compared to a conventional lightning detector by using MMWR data in combination with the lightning data.

Figure 2:
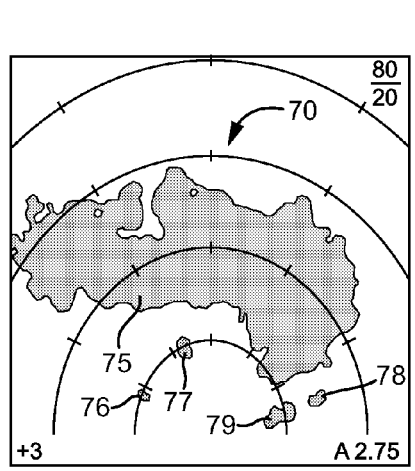
FIG. 2 is a drawing showing weather in spatial regions detected by the system illustrated in FIG. 1 in accordance with an exemplary embodiment.

With reference to FIG. 2, weather 70 detected by system 10 includes weather regions 75, 76, 77, 78 and 79. Each of regions 75, 76, 77, 78 and 79 has a spatial extent as shown in FIG. 2. Regions 75, 76, 77, 78 and 79 are exemplary only.

In one embodiment, system 10 determines presence and spatial extent of weather regions 75, 76, 77, 78 and 79 using MMWR data. The location of regions 75, 76, 77, 78 and 79 can be shown relative to the position of the aircraft on display 16. System 10 can analyze reflectivity parameters or return strength data associated with the MMWR data to detect weather 70. Reflectivity parameters having a return strength over a threshold can be used to determine a presence of weather and its spatial extent in one embodiment. For example, the threshold can be 20 dBZ in one embodiment. Detector 23 uses the range and scan angle associated with returns over the threshold to locate the spatial extent of regions 75, 76, 77, 78 and 79 in one embodiment. In one embodiment, any power returns above the noise floor which can be associated with weather can be used to establish the spatial extent. The 20 dBZ threshold can be scaled with range and compensated for attenuation in one embodiment. To estimate dBZ, compensation for a variety of radar characteristics can be provided.

In one embodiment, once spatial extent of weather 70 is determined, levels associated with the weather can be assigned or mapped. For example, with reference to FIG. 3, levels 81, 83 and 85 of weather 70 (FIG. 2) can be provided on a weather screen 80 of display 16. Levels 81, 83 and 85 are shown relative to aircraft position on screen 80. Levels 81, 83 and 85 can be shown by a variety of display techniques including stippling, cross section, coloring, etc. In one embodiment, colors associated with conventional color radar standards can be utilized such as colors of red, yellow and green. In addition, white and magenta hazard colors and other hazard indications can be utilized. In the exemplary embodiment of FIG. 3, level 81 is represented by the color red, level 83 is represented by the color yellow, and level 85 is represented by the color green.

Figure 3:
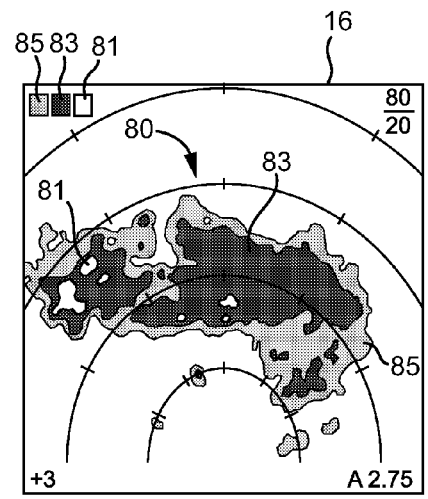
FIG. 3 is a drawing of a screen shot of a display for the system illustrated in FIG. 1 showing levels of the weather illustrated in FIG. 2 in accordance with an exemplary embodiment.

Weather detector 23 preferably processes MMWR data to determine levels of weather 70 (FIG. 2) on screen 80 (FIG. 3). In one embodiment, spectral width parameters can be used to assign levels of weather. Higher thresholds of spectral width correspond to higher levels of weather in one embodiment. In one example, a spectral width parameter above 5 m/s corresponds a red color on display 16, a threshold of 4 m/s spectral width corresponds to a yellow color on display 16 and a spectral width of 3 m/s corresponds to a green color on display 16.

Processor 15 uses the range and tilt angle associated with MMWR data including the spectral width parameters in regions 75, 76, 77, 78 and 79 to locate and assign the level of weather. Additionally, processor 15 can use additional data including lightning data to identify other hazards, such as, convective cells, turbulence, hail, etc. according to an alternative embodiment.

With reference to FIG. 1, radar system 12 advantageously is smaller than conventional X-band radars and utilizes a smaller antenna, such as, antenna 11 having a diameter of less than 18 inches in one embodiment. Accordingly, system 10 can be smaller than conventional radar systems. However, data associated with radar system 12 (e.g., MMWR data) has very high path attenuation and scattering in significant weather which produces uncertainty in reflectivity measurements. When hydrometer sizes exceed about ¼ the wavelength of the radar signal, radar returns do not correspond to Rayleigh scattering models. Operation outside Rayleigh scattering models produces uncertainty. Uncertainty does not allow a MMWR system to rely solely on reflectivity measurements being proportional to levels of weather or weather hazards according to conventional techniques.

Advantageously, MMWR system 12 generally has narrow bean widths for a given size antenna 11 and higher resolution which allows weather to be separated from ground clutter responses. Accordingly, less filtering and processing is required to remove ground clutter according to one embodiment. The higher frequencies associated with MMWR system also produce high Doppler frequency offsets for given velocities as compared to conventional X-band or lower frequency weather radars. High Doppler frequency content allows excellent estimation of mean velocities which in turn provides high quality estimates of velocity dispersion or spectral width data. Accordingly, system 10 advantageously uses spectral width data as opposed to reflectivity data for classifying or mapping levels of weather 80 in one embodiment.

Figure 4:
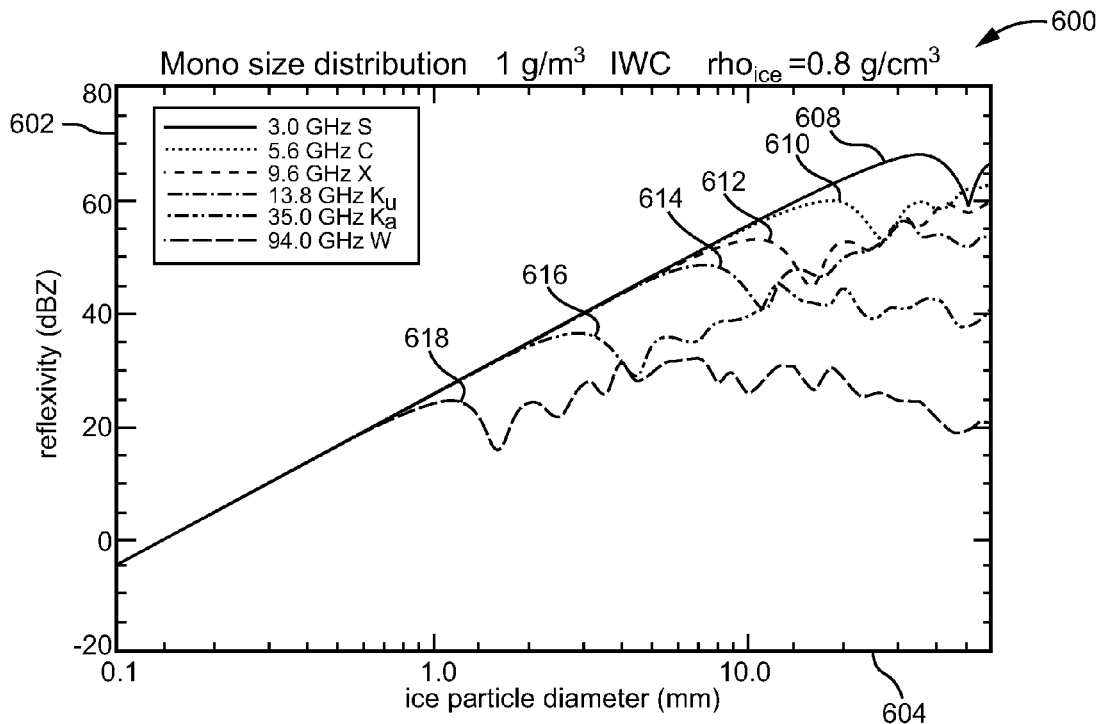
FIG. 4 is a graph showing reflectivity measurements with respect to ice particle diameters on a logarithmic scale for different radar frequencies.

With reference to FIG. 4, reflectivity in dBZ is provided on a y-axis 602 and ice particle diameter in mm is provided on an x-axis 604. Axis 604 is logarithmic in scale. A line 608 on graph 600 shows a relatively linear relationship between reflectivity to ice particle diameter (in logarithmic scale) at 3.0 GHz. Lines 608, 610, 612, 614, 616 and 618 are relatively linear from 5 dBZ to +20 dBZ. The relatively linear nature of the relationship becomes less linear at reflectivities above +20 dBZ for lines 610, 612, 614, 616 and 618 which represent frequencies of 5.6 GHz, 9.6 GHz, 13.8 GHz, 35.0 GHz and 94.0 GHz, respectively.

Figure 5:
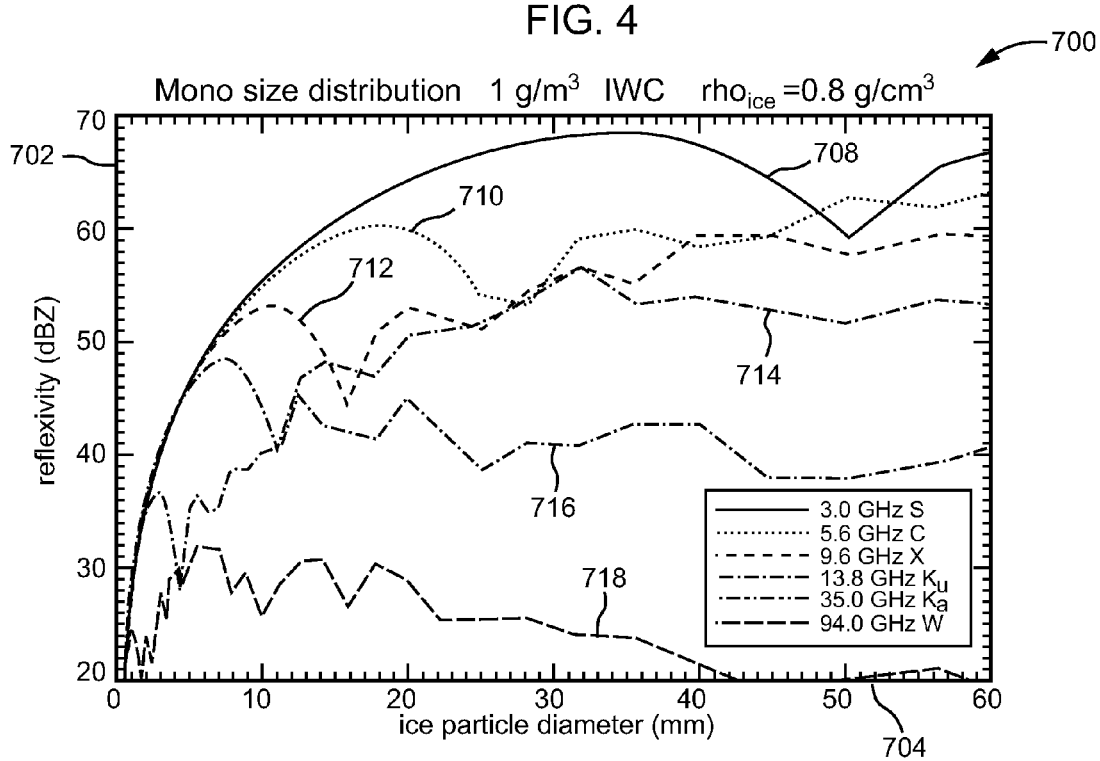
FIG. 5 is another drawing of reflectivity measurements with respect to ice particle diameters on a linear scale for different radar frequencies

With respect to FIG. 5, a y-axis 702 represents reflectivity in dBZ and an x-axis 704 represents ice particle diameters in mm (on a linear scale). A line 708 shows a relationship between ice particle diameters and reflectivity at 3.0 GHz. Lines 710, 712, 714, 716 and 718 show the relationship between reflectivity and ice particle diameter at frequencies of 5.6 GHz, 9.6 GHz, 13.8 GHz, 35.0 GHz and 94.0 GHz, respectively.

In one embodiment, weather detector 23 uses a model which compares conventional X-band airborne reflectivity measurements at or below 20 dBZ to reflectivity measurements in the W-band. Generally, light precipitation at reflectivities less than or equal to 20 dBZ can be readily modeled as Rayleigh targets in the W-band in one embodiment. Therefore, the exemplary model in detector 23 can model reflectivity below 20 dBZ according to an adjusted X-band model in one embodiment. At reflectivities above 20 dBZ, detector 23 uses spectral width for assigning levels of weather. The exemplary 20 dBZ threshold can be adjusted for the frequency of system 12. The threshold can be increased for lower frequencies to operate in the linear house of lines 610, 612, 614, 616 and 618.

Advantageously, MMWR system 12 has a power return advantage over a conventional X-band system in the less than 20 dBZ rain region as the inverse of wavelength to the fourth power. Accordingly, a 28 inch by 28 inch, 100 watt, 1% duty cycle classic X-band weather radar system would have similar range performance as a 28 inch by 2.8 inch 0.1 watt, average power MMWR system at W band if attenuation is not included in the analysis. A narrow beam width allows weather features to be fully identified by their large spatial extent using MMWR data.

In one embodiment, weather detector 23 can utilize spectral width data to detect stratiform rain. W-band frequencies generate Doppler shifts on the order of 620 Hz per meter per second of radial velocity. Generally, Doppler shift of this magnitude produces sampled Doppler shift variation in the 320 Hz range when the radar target is stratiform rain. Convective precipitation produces wider widths. Accordingly, width thresholds can provide a spectral width identifier for types or levels of rain in addition to potential mean Doppler shifts according to an exemplary embodiment of an algorithm for system 10. Levels of weather as well as types of weather (e.g., stratiform and convective regions) can be characterized by using comparison of spectral width to width thresholds according to one embodiment. In addition, weather detector 23 can utilize Doppler spectral width to estimate levels of turbulence in weather cells and provide a turbulence warning.

Weather cell detector 23 is shown in FIG. 1 as part of processor 15 and as receiving inputs from processor 15, detector 21 or other components within system 10. However, detector 23 can receive parameters and data from various aircraft instrumentation to make a convective cell or hazard determination and assign levels of weather. Detector 23 can be operated in conjunction with the operations of processor 15 or separately from the operations of processor 15. Detector 23 can be embodied as its own software routine operating on its own platform. Similarly, detector 21 can be embodied as its own software routine operating on its own platform or line replaceable unit or embodied as part of detector 23. Detector 23 can include instructions stored on a non-transitory medium for operating on a computing platform, such as a weather radar platform manufactured by Rockwell Collins, Inc. or Honeywell, Inc. in one embodiment.

Figure 6:
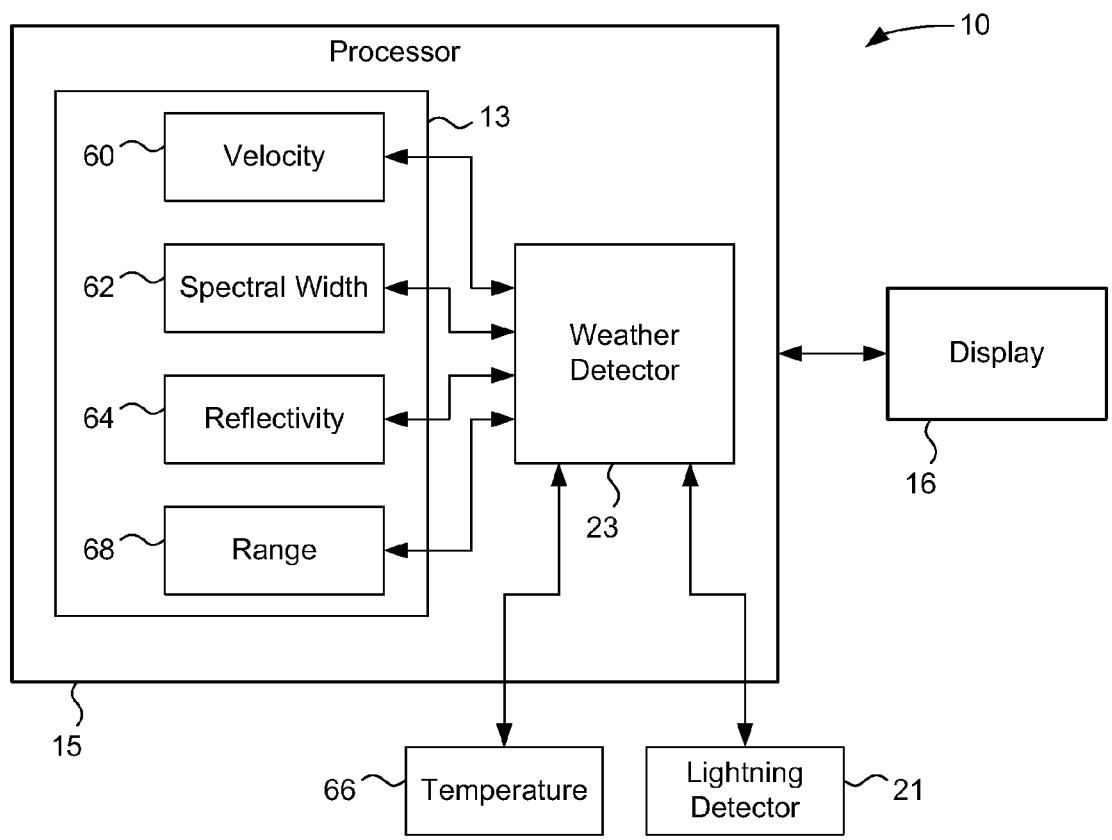
FIG. 6 is a more detailed general block diagram of a processor for the weather detection system illustrated in FIG. 1 in accordance with another exemplary embodiment.

With reference to FIG. 6, system 10 preferably includes a weather radar return processing unit (e.g., processor 15) that can calculate standard deviations of wind velocities, a mean velocity parameter, a spectral width parameter, a range parameter, and reflectivity parameter to generate turbulence alerts, and to provide a display signal to display 16. Alternatively, processor 15 can receive any or all of these listed parameters from system 12. (FIG. 1). In one embodiment, system 10 or 12 detects reflectivity by measuring the power of the returned signal. Velocity is measured by detecting changes in phase angle of returned pulses. Spectral width is measured by detection variation in change of phase angle of returned pulses. Processor 15 can store MMWR data in memory 60 for velocity parameters, memory 62 for spectral width parameters memory 64 for reflectivity parameters, and memory 68 for range parameters. Processor 15 can also use temperature parameters from a temperature sensor 66 and lightning data from lightning detector 21 to assess levels of weather.

Lightning detector 21 preferably provides lightning data indicative of the presence and/or location of weather hazard. The lightning data can be raw data from detector 21 or processed data that indicates a location and presence for each lightning strike. In one embodiment, the lightning data points toward or indicates the bearing of detected weather hazard. The lightning data can also include time of strike.

The time of strike can be referenced to satellite time, time relative to other strikes, time data aboard the aircraft, etc.

Existing lightning sensors use directional antenna to determine the azimuth of the lightning strike. The use the strength of the received signal as compared with average lightning strike return strength to determine range can be inaccurate if the lightning strike being received is different from average strength. System 10 can advantageously correlate radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Display 16 preferably provides color graphical images corresponding to the levels of weather in one embodiment. The graphical images can represent weather regions, rainfall densities, turbulence regions, etc. Detector 23 causes display 16 to provide visual indications of potential hazards and/or convective cells. In one embodiment, audio alerts are also provided. Display 16 can provide symbols, text, graphics, colored regions, and other visual indicia to represent weather phenomena or hazards.

System 10 can be configured to include the features associated with convective cell and hazard detection. Advantageously, system 10 can determine the presence of a convective cell or hazard by data derived from millimeter wave radar (MMWR) data. Processor 15 and/or detector 23 can also utilize the lightning data to determine the presence of a convective cell or weather hazard in one embodiment. For example, if weather detector 23 indicates that lightning is occurring at a particular heading or a particular direction from the aircraft and MMWR data indicates that weather is located in that direction, processor 15 can mark that cell on display 16 as being a convective cell because lightning indicates the presence of a conductive cell which may contain hail, lightning or high turbulence. Spatial and temporal filtering can be used to correlate MMWR data with the lightning data.

Figure 7:
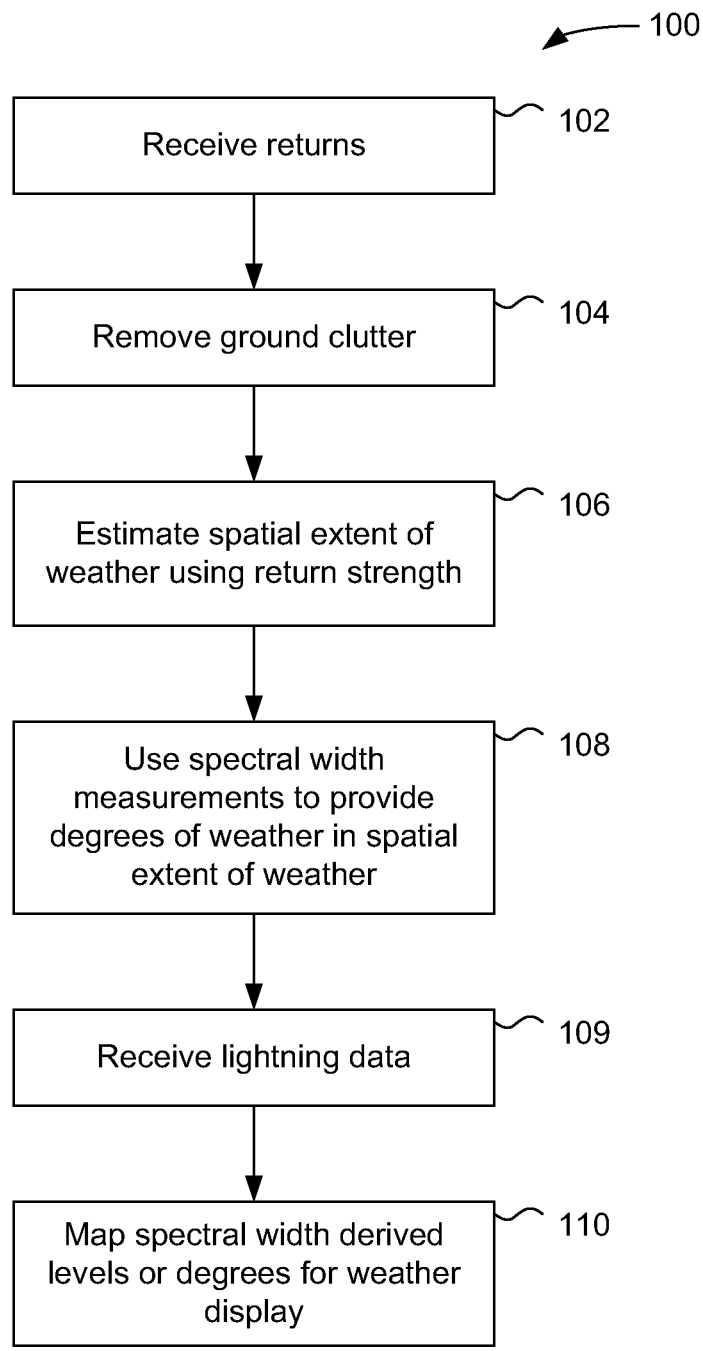
FIG. 7 is a flow diagram showing operation of the weather radar system illustrated in FIG. 1 in accordance with another exemplary embodiment.

With reference to FIGS. 6 and 7, processor 15 of system 10 uses an exemplary method 100 to detect and assess levels of weather. Processor 15 provides signals, either directly to receiver/transmitter circuit 18 or indirectly through memory 13, so that system 12 provides radar beams at radar antenna 11. Processor 15 receives radar returns or data associated with the returns at a step 102.

Processor 15 can receive the radar returns (or signals/data related thereto) directly or through memory 13. Processor 15 can respond to computer instructions to complete the steps of method 100. At a step 104, ground clutter can be removed. In general, ground clutter can be removed by a variety of techniques. Ground clutter can be removed by comparing predicted mean Doppler velocity derived from inertial ground speed measurements with measured mean Doppler velocity in one embodiment. Signals which deviate from predicted mean Doppler velocity are likely to be weather moving over the ground. Alternatively, ground clutter can be removed by comparing smoothness of return amplitude over a spatial extent. Returns from weather tend to have larger variation in return amplitude. Alternatively ground clutter can be removed by comparing predicted versus measured return amplitude with tilt angle. MMWR has an advantage when beam width is narrow since the beam tilt can be configured to place the beam above the ground and the return signals will not be contaminated with ground returns, i.e. ground clutter removal can be obtained simply by beam placement. There are many other ways to remove ground clutter which can be used without departing from the scope of the invention. Weather can be identified by its relatively large spatial extent in the MMWR reflectivity data. The larger spatial extent of weather can be more easily identified using MMWR reflectivity data than conventional X-band data. At a step 106, processor 15 determines weather spatial extent using reflectivity data. In one embodiment, reflectivity data is not used to determine levels of weather In conventional X-band radar systems, the reflectivity estimate of the weather in dBZ would be estimated by return power strength. Since reflectivity estimates from MMWR signals become inaccurate when particle sizes are large, as shown in FIG. 4 and as previously discussed, it is difficult to estimate reflectivity accurately in calibrated fashion at high reflectivity values. (As discussed above, reflectivity estimates of 20 dBZ or below can be calibrated at W-band). In one embodiment, the non-calibrated MMWR reflectivity estimates are used to determine only the spatial extent of the weather. MMWR has an advantage when beam width is narrow since the beam tilt can be configured to place the beam above the ground and the return signals will not be contaminated with ground returns.

At a step 108, processor 15 determines the weather levels of weather based upon spectral width data. Processor 15 maps the level of weather for a display 16. Spectral width can be obtained by converting return signals to frequency domain and obtaining the width of the resulting power spectrum directly in one embodiment. Alternatively, spectral width can be obtained by computing the variance of return signal phase angles, i.e. autocorrelation techniques. At a step 110, system 10 displays weather including indications of levels of weather.

At a step 109, processor 15 can receive the lightning data either directly or through memory 13. Detector 23 preferably utilizes information to identify and locate lightning bolts on display 16. A flash density can be used to assess convectivity of weather derived from data from lightning detector 21. Applicants believe that a reasonable pointing angle utilizing a conventional weather hazard detector is still provided even though relatively weak ranging data can be associated with lightning bolts. Ranging data can be improved by correlating lightning data with measured reflectivity as discussed above. Step 109 is optional.

Utilizing the lightning data in step 109, a weather detector 23 can identify cells or systems as including more hazardous weather and cells as not including as hazardous weather because of the limited or lack of lightning. Accordingly, a pilot can advantageously find a flight path through weather which may have been avoided as hazardous weather without the advantageous use of lightning data.

Flash rate history may be used to determine cell maturity. Increasing flash rates verses time indicate a cell in a growth stage while decreasing flash rates verses time indicate a cell that is decaying. High continuing flash rates indicate possible mature super-cell convection.

The determination of cell maturity allows cells that are in the dissipating stages to be identified as potential flight paths when needed by an aircraft after some delay to allow decaying non-flashing cells to discharge. Flash rate history can be stored in memory 13 in system 41.

Threat descriptions on display 16 can include lightning, hail, and turbulence. All three hazards can have substantial impact on airline operations and may be blended with a weather radar's solo threat assessments at shorter ranges. In one embodiment, the display of turbulence and potential lightning may be paired with entire cells and circled by a line of the normal turbulence color at lower levels of hazard. Regions of likely lightning and directly measured turbulence may use either a solid second level turbulence color or be encoded with an icon. Display 16 should allow slewing from the full cell identification of convective weather at long ranges to a shorter range sub-cell size regions of likely hazard.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A weather radar system for an aircraft, comprising:
   a radar antenna; and
   processing electronics configured to use millimeter wave radar (MMWR) data derived from signals received on the radar antenna, the processing electronics configured to sense a presence of weather and a spatial extent of the weather using return strength data associated with the MMWR data, the processing electronics configured to use spectral width data associated with the MMWR data to assign precipitation rates to the weather in the spatial extent, the processing electronics configured to provide display data for representing a portion of the weather in the spatial extent at the precipitation rates, wherein each of the precipitation rates is one of at least three radar precipitation rate levels.

2. The weather radar system of claim 1, wherein the processing electronics is configured to identify a convective cell using the spectral width data and lightning data from a lightning sensor.

3. The weather radar system of claim 1, wherein the processing electronics is configured to map a presence of a weather hazard on a display using the precipitation rates assigned using the spectral width data.

4. The weather radar system of claim 3, wherein the processing electronics is configured to use red, yellow, and green levels as the radar precipitation rate levels.

5. The weather radar system of claim 1, wherein the processing electronics is configured to receive lightning data and the processing electronics is configured to use the lightning data to identify a convective cell, turbulence, or hail.

6. The weather radar system of claim 5, further comprising a display, wherein the convective cell on the display is marked as hazardous based on the correlation of the MMWR data and a geographic area of the aircraft.

7. The weather radar system of claim 1, wherein the MMWR data is provided by an MMWR radar providing signals in the 13 to 300 GHZ range.

8. The weather radar system of claim 7, wherein the MMWR radar includes the radar antenna, the radar antenna having a diameter of less than 18 inches.

9. The weather radar system of claim 1, wherein the processing electronics is configured to provide an indication of convective or stratiform weather based upon the spectral width data.

10. A method of displaying an indication of weather on an aircraft display, the method comprising:
    receiving millimeter wave radar (MMWR) returns on a radar antenna;
    receiving MMWR data derived from the MMWR returns;
    estimating a presence of weather in a spatial region using a reflectivity parameter associated with the MMWR data;
    determining precipitation rate levels of the estimated presence of weather in the spatial region using a spectral width parameter associated with the MMWR data; and
    causing the precipitation rate levels to be displayed on a display as red, yellow, and green regions.

11. The method of claim 10, wherein the precipitation rate levels are determined using the reflectivity parameter according to a model for reflectivity parameters below 20 dBZ.

12. The method of claim 10, further comprising determining a convective cell using the MMWR data and lightning data.

13. The method of claim 12, wherein a stratiform rain indication is provided in response to the spectral width parameter.

14. A method of displaying weather, the method comprising:
    sensing reflectivity and spectral width using a millimeter wave sensor;
    receiving millimeter wave data from the millimeter wave sensor;
    using a reflectivity data portion of the millimeter wave data to determine location and spatial extent of a weather system;
    determining at least three weather precipitation rates for the spatial extent of the weather system using a spectral width data portion of the millimeter wave data; and
    displaying the weather precipitation rates on a display using three colors.

15. The method of claim 14, further comprising displaying the weather system with respect to a location of an aircraft.

16. The method of claim 14, further comprising providing a turbulence warning in response to the spectral width data portion.

17. The method of claim 14, further comprising using the millimeter wave sensor for targeting.

18. The method of claim 14, wherein red, yellow, or green are used to display the weather precipitation rates.

19. The method of claim 14, further comprising receiving lightning data and using the lightning data to identify a convective cell, hail, or turbulence.

* * * * *